Feb. 14, 1956 H. ORNER 2,734,412
SCREW-TENSIONING DEVICE
Filed April 19, 1954 2 Sheets-Sheet 1
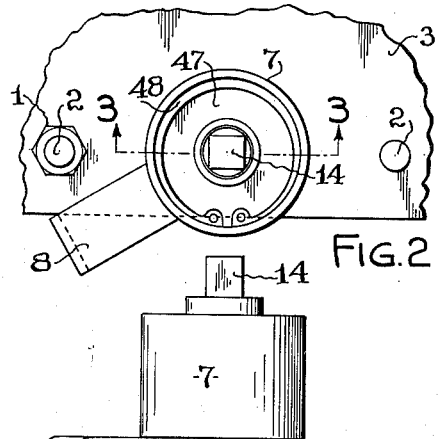
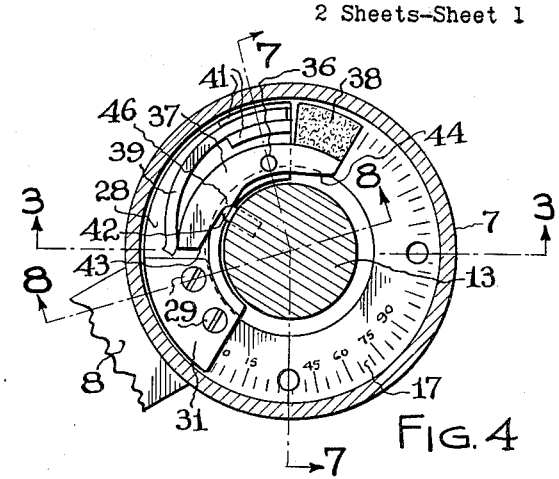
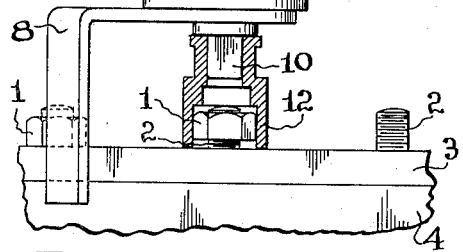
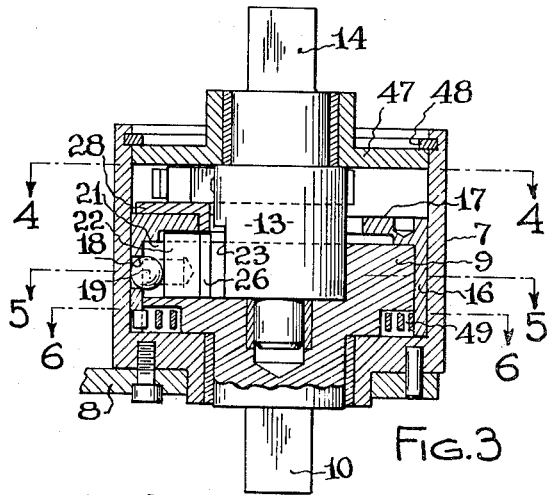
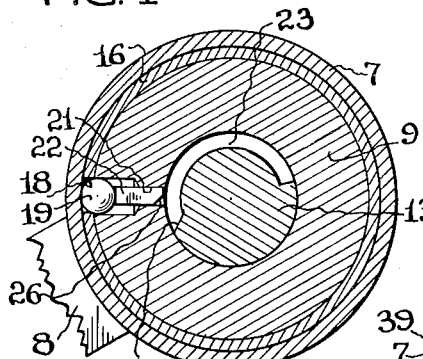
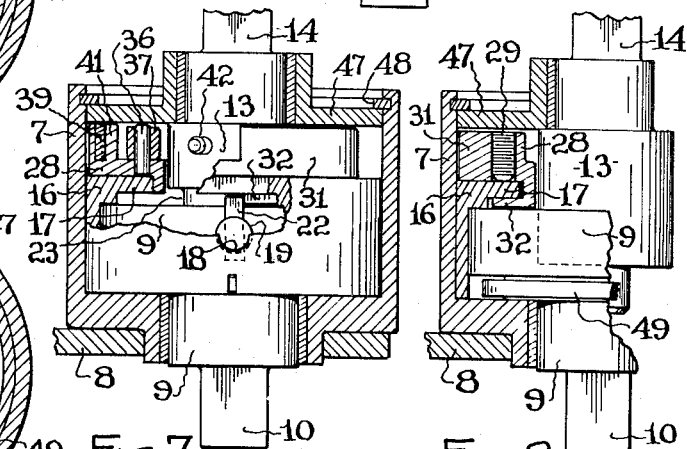
INVENTOR:
HARRY ORNER
BY
ATTORNEY Feb. 14, 1956  H. ORNER  2,734,412
SCREW-TENSIONING DEVICE
Filed April 19, 1954  2 Sheets-Sheet 2

INVENTOR:
HARRY ORNER
BY
ATTORNEY.

United States Patent Office 2,734,412
Patented Feb. 14, 1956

2,734,412

SCREW-TENSIONING DEVICE

Harry Orner, Altadena, Calif.

Application April 19, 1954, Serial No. 424,127

10 Claims. (Cl. 81—52.4)

This invention relates to a screw-tensioning device, and more particularly to a wrench unit for applying a predetermined tension to bolts, studs, cap screws and the like.

In the use of bolts and similar threaded fasteners for retaining members at high stresses, a properly tightened nut is one which applies to the bolt a tension load at least equal to the external load on the bolt assembly. When this condition is fulfilled the bolt will not fail by fatigue since it cannot experience a change in stress regardless of the fluctuating nature of the load. Furthermore, the bolt will not fail statically because, for the nut to be tightened as indicated, the bolt must be capable of supporting the maximum external load to which it will be subjected.

In attempting to tighten nuts in a manner applying the desired tension load as indicated above, it is conventional practice to employ a torque wrench, that is to say a device for measuring the force of turning the nut at a given lever arm. Torque wrenches, however, cannot be operated successfully without a skilled technician to establish the torque required for the particular assembly, or without a skilled mechanic capable of maintaining the torque wrench in motion, sustained motion being necessary because of the difference between dynamic and static friction. Furthermore, since the force of wrenching the nut is largely used up in friction in the threads of the bolt, lubrication, plating, surface finish, etc., create variables in friction which can greatly alter the torque requirement of the assembly. Because of these variables, it is extremely difficult to utilize a torque wrench in a manner effecting the proper axial stress on the bolt or other threaded fastener.

In view of the above factors characteristic of the use of torque wrenches to tighten nuts and other threaded fasteners, it is an object of the present invention to provide a screw-tensioning device which operates independently of torque and thus is not affected by variables such as friction and the like.

A further object of the invention is to provide a wrench unit adapted to effect a predetermined tensioning of a threaded member by turning the same through a predetermined angle after an initial wrenching operation has been completed, the initial wrenching being adapted to take up all looseness and play in the threads.

An additional object is to provide a wrench unit operative to turn a nut through a number of revolutions sufficient to take up all play in the threads and effect a predetermined tightening, and thereafter to turn the nut through a pre-calculated angle effecting the desired tensioning of the associated threaded member.

An additional object is to provide indexing, cam and clutch means such that a wrenching member is in driving relationship with the nut being tightened for an undetermined number of revolutions and until a predetermined initial tightening is achieved, continues to be in driving relationship with the nut to effect a predetermined angular displacement sufficient to effect the desired threaded member tensioning, and thereafter rotates free and out of driving relationship with the nut.

These and other objects and advantages of the invention will be more fully set forth in the following specification and claims considered in connection with the attached drawings to which they relate.

In the drawings:

Figure 1 is a side elevational view illustrating the screw-tensioning or wrenching unit in operative position on a nut to be tightened;

Figure 2 is a top plan view of the showing of Figure 1;

Figure 3 is an enlarged vertical central section along line 3—3 of Figure 2;

Figure 4 is a horizontal section taken along line 4—4 of Figure 3;

Figure 5 is a horizontal section along line 5—5 of Figure 3;

Figure 6 is a horizontal section along line 6—6 of Figure 3;

Figure 7 is a vertical sectional view taken along the broken line 7—7 of Figure 4;

Figure 8 is a partial vertical section taken along line 8—8 of Figure 4;

Figure 15:
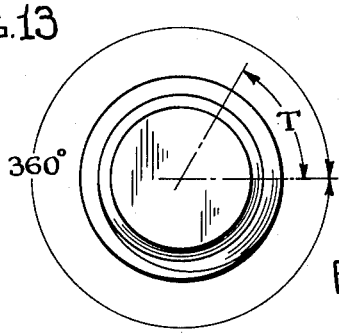
Figure 15 is an end view of a typical threaded member.
Figure 16:
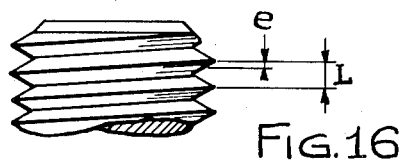
Figure 16 is a fragmentary side elevation of the member shown in Figure 15.

Stated generally, the wrench unit or screw-tensioning device comprises a means for tightening a nut until all play and looseness is taken up, and thereafter turning the nut through a final predetermined angle such that the associated bolt is pre-loaded to the requisite stress. In calculating the final angle through which the nut is turned in order to effect the desired pre-loading, and referring to Figures 15 and 16, use is made of the equations:

(1) $$\frac{T}{360} = \frac{e}{L}$$

where T is the number of degrees through which the nut must be turned to effect pre-loading, e is the elongation throughout the entire length of the screw and given in inches, and L is the lead of the screw in inches.

(2) $$\text{Young's modulus } (E) = \frac{\text{stress}}{\text{strain}} = \frac{Pl}{Ae}$$

where P is the maximum load to which the screw may be subjected and given in pounds, l is the overall length of the screw and given in inches, A is the cross sectional area of the screw in square inches, and e is again the overall elongation of the screw in inches.

Combining the above equations, the following overall equation is given for the unknown angle:

$$(3) \qquad T = \frac{360 \, Pl}{AEL}$$

As an example, let it be assumed that it is desired to calculate the angle T for a screw having a ½—20 national fine thread, the screw being two inches long and being made of steel having an allowable unit stress of one hundred twenty thousand pounds per square inch, and a Young's modulus of thirty million. Such a screw has a lead (L) of .05 inch, and the ratio $$\frac{P}{A}$$

is known to be one hundred twenty thousand pounds per square inch as stated. Substituting in Equation 3:

$$T = \frac{(360)(120,000)(2)}{(30,000,000)(.05)} = 57.6 \text{ degrees}$$

Accordingly, the device is set so that the final angle of turning is 57.6 degrees.

Although the above equation produces the correct theoretical angle, in actual practice a constant must be introduced to take care of such factors as load compression and thread deformation.

Referring next to the drawings, and particularly to Figures 1 and 2, the invention is illustrated as utilized in tightening or wrenching nuts 1 on studs 2 for the purpose of securing a plate 3 to an underlying plate 4 in which the studs 2 are anchored. It is to be understood, however, that the invention is equally applicable to the tightening of other threaded or screw members, such as cap screws and the like, and may operate either by turning the threaded members themselves or by turning nuts as illustrated.

The screw-tensioning or wrenching device comprises a cylindrical casing 7 to which is secured an arm 8 adapted to bear against one edge of plates 3 and 4 for the purpose of holding the casing 7 against rotation, it being assumed that the nuts 1 are turned clockwise, as viewed from above, in order to tighten them. Journaled in casing 7 is a relatively large cylindrical driven member 9 which is provided at its lower end with a reduced squared portion 10 adapted to drivingly fit into the socket 12 for nuts 1. The socket 12 may be replaced by other sockets for nuts of different types and sizes, and by other connecting members where cap screws or the like are to be tightened. A cylindrical drive member 13, of lesser size than the main body of driven member 9, is rotatably seated in a recess in the upper portion of the driven member and is provided with reduced bearing portions such that it may rotate in the driven member and in casing 7. At its upper end, drive member 13 is provided with a reduced squared portion 14 adapted to be associated either with a suitable drive motor or with a manually operated turning handle.

According to the invention, clutch means are provided to associate driving member 13 with driven member 9 and in a predetermined manner effecting rotation of the nuts 1 until a predetermined tensioning of studs 2 is achieved. The clutch means comprise a clutch barrel 16 having a cylindrical wall the outer surface of which bears slidably against the interior surface of casing 7, and the inner surface of which bears slidably against the exterior surface of driven member 9. Clutch barrel 16 is provided at its upper portion with a flange 17 which extends inwardly over the upper surface of driven member 9 but is spaced somewhat thereabove. Referring particularly to Figure 3 and Figures 12–14, the wall of clutch barrel 16 is provided with an aperture 18 adapted to receive somewhat less than half a ball 19, the major portion of the ball being disposed within a rectangular recess 21 in driven member 9.

Figure 13:
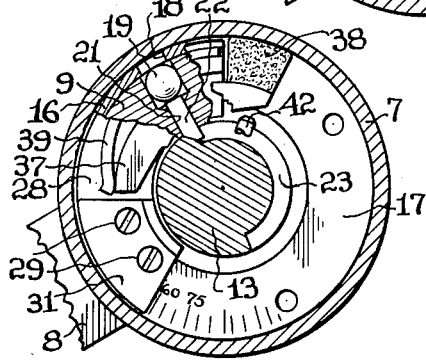
Figure 13 illustrates the positions assumed after turning of the parts through the final predetermined wrench angle.
Figure 14:
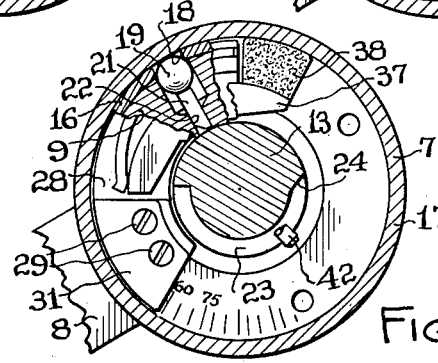
Figure 14 illustrates the positions of the parts after the drive member has rotated free and after completion of the wrench angle.

A vertically disposed floating key or detent 22 is slidably mounted within a slot or recess which communicates with recess 21, the key being generally rectangular in shape and being adapted to shift the ball 19 into aperture 18. Conversely, the ball 19 is adapted to shift the key 22 into a recess or cut 23 in drive member 13. One wall 24 of recess or cut 23 is adapted upon continued clockwise rotation of drive member 13 to engage a corresponding beveled wall 26 of detent 22 and to cam the detent and thus ball 19 into aperture 18, this occurring when the recess 21 is registered with aperture 18 as shown in Figures 13 and 14. Conversely, any relative rotation between the barrel 16 and driven member 9 will operate to shear ball 19 out of aperture 18 and thus force detent 22 into recess 23, again assuming that the recess 23 is opposite the detent. It is of importance that the upper edge of detent 22 projects above the upper wall of driven member 9 so that it may be engaged by the brake and indexing portion of the clutch means and as will next be described.

The brake and indexing portion of the clutch means comprises an arcuate index plate or member 28 mounted on the flange 17 of barrel member 16 by means of two screws 29 extended through an enlarged block portion 31 at one index plate end. Plate 28 is provided beneath block portion 31 with an underhanging index lip 32 inserted between flange 17 and the upper surface of driven member 9 as illustrated in Figure 8. The portion of index plate 28 not beneath block portion 31 is not provided with an underhanging lip 32 but instead is merely flanged, as shown in Figure 3. With the described construction, the forward edge of lip 32 is adapted to drivingly engage the projecting upper edge portion of detent 22 as illustrated in Figure 7, but the detent is free to move away from lip 32 as will be described hereinafter. It will be observed that by merely loosening the screws 29 the index plate 28 may be shifted to various positions on flange 17, this being because there is no longer a clamping action effected by the screws 29 and the underhanging lip 32.

Pivotally mounted on index plate 28 by means of a pin 36 is an arcuate brake lever 37 having a brake shoe portion 38 at its end remote from the block portion 31 of the index plate. A leaf spring 39, which is secured at one end in a bifurcated boss portion 41 of index plate 28, bears inwardly against the end of brake lever 37 adjacent block portion 31. Leaf spring 39, therefore, tends to pivot brake lever 37 counterclockwise as viewed from above, so that the brake shoe portion 38 comes into braking engagement with the stationary casing 7.

Figure 12:
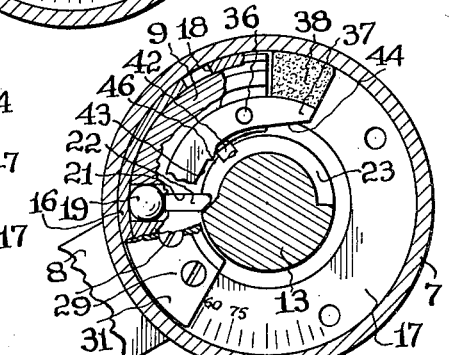
Figure 12 illustrates the parts after application of the brake and in the positions assumed just prior to their turning through the final predetermined wrench angle.

In order to control the position of brake lever 37, a cam actuator pin 42 is anchored in drive member 13 so that it projects radially outwardly toward the inner surface of the brake lever, the pin 42 being preferably disposed at the center portion of the cut or recess 23 in the drive member but substantially thereabove as illustrated. Sloping cam surfaces 43 and 44 separated by a protuberance 46 are provided on the inner brake lever surface, the first cam surface 43 being relatively adjacent the block portion 31 and being so shaped that when the part thereof adjacent protuberance 46 is engaged by cam actuator pin 42 the brake shoe 38 will be separated from casing 7 as illustrated in Figure 4. Cam surface 44, on the other hand, is inwardly curved in a manner such that after the pin has ridden over protuberance 46 the brake lever 37 will be permitted to pivot counterclockwise about pin 36 and into braking engagement with casing 7 as shown in Figure 12. The shape of protuberance 46 is such, and the applied force of leaf spring 39 is such, that cam actuator pin 42 will not ride over protuberance 46 from cam surface 43 to cam surface 44 until the brake lever is restrained by a force sufficient to effect a predetermined tightening of a nut 1 on its associated stud 2, this tightening being sufficient to take up all looseness and play so that the nut is ready to be turned through its final angle.

In order to permit the operator of the unit to regulate the final angle through which a nut 1 is turned, a suitable scale is provided on the upper surface of flange 17 and is marked in degrees as illustrated. The scale is so placed that when the rear face of enlarged index portion 31, remote from brake lever 37, is registered with a particular degree marking on the scale, the aperture 18 will be spaced from the forward edge of lip 32 by the number of degrees indicated. Thus, and referring to Figure 10, it will be noted that the scale reads approximately 57.6 degrees, which means that aperture 18 is 57.6 degrees from the forward edge of lip 32.

It will be apparent that by loosening screws 29 the index plate, together with the brake lever 37, etc., may be shifted along flange 17 to regulate the spacing between aperture 18 and the lip edge. In order to provide access to the screws 29 and index plate 28 for the purpose of changing the setting of the unit, the upper wall 47 of casing 7 is lifted out of position after removal of the snap ring 48 which normally holds it in place. A torsion spring 49 is provided in a channel surrounding the lower portion of the main body of driven member 9 and is connected between the driven member and cylindrical barrel wall 16 as illustrated in Figure 6. The connection of the torsion spring is such that driven member 9 is biased in a counterclockwise direction and will therefore tend to assume the position at which detent 22 is seated on the forward edge of index lip 32 as shown in Figure 7.

Figure 10:
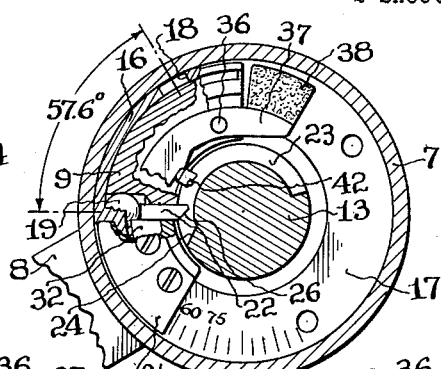
Figure 10 is a horizontal sectional view illustrating the position of the component parts of the unit at the beginning of a wrenching operation.

In the operation of the screw-tensioning or wrench device, let it be assumed that the socket 12 has been inserted over a loose nut 1 as shown in Figure 1, and that the parts are initially in the position shown in Figure 10. Let it be further assumed that the unit has been set so that aperture 18 is 57.6 degrees away from the forward edge of index lip 32, the angle having been pre-calculated as described heretofore. Clockwise turning of drive member 13 will then cause cam actuator pin 42 to bear against protuberance 46 of brake lever 37, which will effect clockwise rotation of clutch barrel 16 on which the brake lever is mounted. Similarly, driven member 9 will be rotated clockwise along with drive member 13 due to the engagement of detent 22 by the forward edge of index lip 32.

Figure 11:
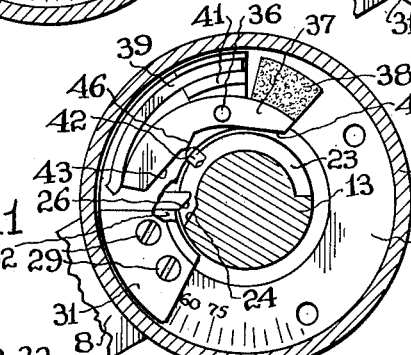
Figure 11 illustrates the positions of the parts after the initial tightening of the nut has been achieved, so that continued clockwise rotation of the drive member effects application of the brake.

The drive member, clutch barrel and driven member thus rotate clockwise together to effect turning of nut 1, and this rotation continues until the nut is tightened a predetermined amount determined by the setting of leaf spring 39. When the nut has been tightened to the predetermined value, the driven member 9 operates through detent 22 and lip 32 to retard clockwise movement of the index plate 28 and brake lever 37, so that continued clockwise movement of drive member 13 causes cam actuator pin 42 to ride over protuberance 46 as shown in Figure 11. Pin 42 then comes into engagement with cam surface 44, which permits leaf spring 39 to pivot the brake lever 37 counterclockwise to the braking position shown in Figure 12. The shape of protuberance 46 is such that the turning of drive member 13 relative to driven member 9, as pin 42 rides over the protuberance, causes cam wall 24 of recess 23 to come into engagement with cam wall 26 of detent 22 as shown in Figure 12, the detent then being held in its innermost position by the ball 19 which in turn bears against the cylindrical wall of barrel 16. It is to be remembered that during all of this initial turning the spacing between aperture 18 and the edge of index lip 32 remains constant since the clutch barrel 16 and driven member 9 rotate and stop together.

Upon continued clockwise turning of drive member 13 a powerful direct drive is effected between the drive member and detent 22, the latter being seated in the driven member 9 so that a strong clutch action is provided effecting clockwise turning of nut 1 through the final tightening angle. After the drive member 13 and driven member 9 have turned clockwise through the final angle of 57.6 degrees, the ball 19 is registered with aperture 18, as shown in Figure 13, and the operation of cam walls 24 and 26 is such as to cam the detent 22 radially outwardly until the ball 19 is seated within aperture 18 as shown in Figure 14. At this time, the inner surface of detent 22 is disposed outwardly of the drive member 13 so that the drive member may continue to rotate clockwise free of the driven member 9, the parts then being in the Figure 14 position.

After the parts are in the position shown in Figure 14, the operator lifts the unit off the first tightened nut and places it on a second loose nut. It is to be noted that when the unit is thus removed the casing 7 is locked to barrel 16 by means of the brake lever 37, and the barrel is in turn locked to the driven member 9 by means of the ball 19 and the detent 22, the latter then bearing against the peripheral wall of drive member 13 since it is not opposite the cut or recess 23. The casing, driven member and barrel are thus held against relative movement despite the fact that the torsion spring 49, which was tightened during the relative rotation between driven member 9 and barrel 16, tends to move the driven member and thus detent 22 until the detent is seated on the forward edge of index lip 32.

Figure 9:
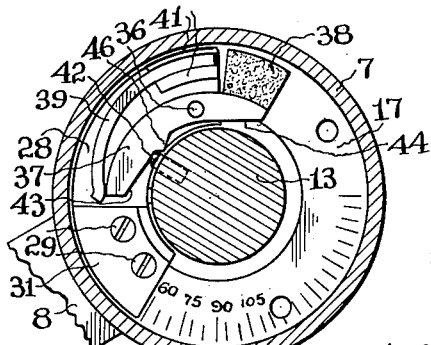
Figure 9 is a horizontal sectional view corresponding to Figure 4 but showing the indexing means as set for an angle of wrenching different from that illustrated in Figure 4.

After the unit has been placed on a loose nut as indicated, the clockwise movement of drive member 13 is continued. This causes the forward portion of cut or recess 23 to come into registry with detent 22 so that the latter is free to move radially inwardly and free the ball 19. The ball 19 is then sheared into recess 21 by the action of driven member 9 as it is rotated counterclockwise by the torsion spring 49, this motion continuing until detent 22 seats on index lip 32. Upon continued clockwise movement of the drive member 13, the cam actuator pin 42 rides up cam surface 43 and pivots brake lever 37 clockwise about pin 36 until brake shoe 38 is pivoted away from casing wall 7. The parts are thus returned to the initial position illustrated in Figure 9 and a second cycle of operation is commenced.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A wrench unit for applying a predetermined tension to a threaded member, which comprises a driven member adapted to effect relative turning between said threaded member and the correspondingly threaded member with which it is threadedly associated, a rotating drive member, first clutch means to operatively associate said drive and driven members to effect turning of the latter until a predetermined initial tightening of said threaded members has been achieved, and second clutch means to operatively associate said drive and driven members after said initial tightening has been achieved, said second clutch means being adapted to effect turning of said driven member only until said threaded members have been turned relative to each other through an angle calculated to result in said predetermined threaded member tension.

2. The invention as claimed in claim 1, in which said first clutch means includes a member under a predetermined spring bias.

3. The invention as claimed in claim 1, in which said second clutch means is adjustable to effect relative turning of said threaded members through various angles.

4. A wrench unit for applying a predetermined tension to a bolt, which comprises a casing, a driven element journaled in said casing and adapted to seat drivingly over a nut on said bolt, a driving element journaled in said casing and adapted to be rotated in a direction effecting tightening of said nut on said bolt when said driving element is connected to said driven element, a clutch element rotatably mounted in said casing, first means operable to connect said driven element to said driving element except when said driven element is in a predetermined rotated position relative to said clutch element, and second means operable to prevent said driven element from assuming said predetermined rotated position relative to said clutch element until a predetermined tension has been applied to said bolt.

5. The invention as claimed in claim 4, in which said second means comprises means to drivingly connect said driving element to said clutch element and to said driven element independently of said first means and until a predetermined tightening has been applied to said nut, and thereafter to release said driven element and effect locking of said clutch element to said casing, whereby continued rotation of said driving element operates through said first means to rotate said driven element to said predetermined rotated position relative to said locked clutch element.

6. The invention as claimed in claim 5, in which means are provided to adjust the angle through which said driven element rotates after locking of said clutch element to said casing and before said driven element reaches said predetermined rotated position relative to said clutch element.

7. A wrench unit for applying a predetermined tension to a bolt, which comprises a cylindrical casing, means to prevent rotation of said casing, a cylindrical driven element journaled in said casing and having an extension portion adapted to seat drivingly over a nut on said bolt, a cylindrical driving element journaled in said casing and in said driven element and having an extension portion adapted to be motor driven, a clutch barrel rotatably mounted between said driven element and the interior wall of said casing, detent means mounted in said driven element and movable selectively into a recess in said driving element and into a recess in said clutch barrel, said detent means being adapted when in either position to be cammed to the other position when registered with the opposite recess, an index member adjustably mounted on said clutch barrel and adapted to bear against a stop associated with said driven element, a brake lever pivotally mounted on said index member to selectively lock the same to said casing, spring means to bias said lever toward braking position, and cam means associated with said brake lever and said driving element and adapted firstly to hold said lever in released position and to effect rotation of said index member and thus said clutch barrel and driven element with said driving element, and thereafter to permit movement of said brake lever to braking position and to free said driving element of said index member and clutch barrel so that subsequent movement of said driven element by said driving element is effected through said detent means.

8. The invention as claimed in claim 7, wherein second spring means are provided to bias said driven element toward the position at which said stop associated with said driven element bears against said index member.

9. A wrench unit for applying a predetermined tension to a threaded member, which comprises a driven member adapted to effect relative turning between said threaded member and the correspondingly threaded member with which it is threadedly associated, a rotating drive member, first means to operatively associate said drive and driven members to effect turning of the latter until a predetermined initial tightening of said threaded members has been achieved, and second means to operatively associate said drive and driven members after said initial tightening has been achieved, said second means being adapted to effect turning of said driven member only until said threaded members have been turned relative to each other through a predetermined angle of such magnitude as to result in said predetermined threaded member tension.

10. A wrench unit for applying a predetermined tension to a threaded member, which comprises drive means to effect relative turning between said threaded member and a second correspondingly threaded member with which it is threadedly associated, index means, means to effect turning of said index means by said drive means until a predetermined initial tightening of said threaded members has been achieved and thereafter to free said index means of said drive means so that said index means becomes stationary, and means associated with said index means to limit turning of said drive means after said freeing of said index means to an angle calculated to effect said predetermined tensioning of said threaded member.

References Cited in the file of this patent

UNITED STATES PATENTS

| 1,494,056 | Benko | May 13, 1924 |
| 2,157,574 | Siesel | May 9, 1939 |
| 2,378,956 | Thorner | June 26, 1945 |
| 2,441,038 | Siesel | May 4, 1948 |
| 2,525,379 | Smilansky | Oct. 10, 1950 |
| 2,600,327 | Ridge | June 10, 1952 |
| 2,632,485 | Peck | Mar. 24, 1953 |

FOREIGN PATENTS

| 233,207 | Great Britain | May 7, 1925 |